United States Patent
Kong et al.

(10) Patent No.: US 11,479,245 B2
(45) Date of Patent: Oct. 25, 2022

(54) SEMI-AUTONOMOUS VEHICLE CONTROL SYSTEM AND METHOD OF CONTROLLING A SEMI-AUTONOMOUS VEHICLE

(71) Applicant: Honda Motor Co., Ltd., Tokyo (JP)

(72) Inventors: Rita Vense Kong, Irvine, CA (US); Guido Rasser, Redondo Beach, CA (US); Shinngaram Choi, San Gabriel, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 684 days.

(21) Appl. No.: 16/275,910

(22) Filed: Feb. 14, 2019

(65) Prior Publication Data

US 2020/0262424 A1 Aug. 20, 2020

(51) Int. Cl.
*B60W 30/12* (2020.01)
*G05D 1/00* (2006.01)
(Continued)

(52) U.S. Cl.
CPC ............ *B60W 30/12* (2013.01); *B60K 35/00* (2013.01); *B60Q 9/00* (2013.01); *B62D 15/025* (2013.01);
(Continued)

(58) Field of Classification Search
CPC ............ B60W 30/12; B60W 2554/00; B60W 2556/60; B60W 2420/42; G05D 1/0088;
(Continued)

(56) References Cited

U.S. PATENT DOCUMENTS

| 7,711,464 B2 | 5/2010 | Kaufmann |
| 8,466,806 B2 | 6/2013 | Schofield |

(Continued)

FOREIGN PATENT DOCUMENTS

| CN | 105000064 A | * 10/2015 | ........... B62D 15/029 |
| CN | 107826116 A | 3/2018 | |

(Continued)

OTHER PUBLICATIONS

English Translation: Lu et al., CN 105000064 A, Oct. 2015, Chinese Patent Office Patent Publication (Year: 2015).*

(Continued)

*Primary Examiner* — Nadeem Odeh
(74) *Attorney, Agent, or Firm* — Armstrong Teasdale LLP

(57) ABSTRACT

A vehicle control system for a semi-autonomous vehicle is provided. The vehicle control system includes a controller coupled to a plurality of sensors positioned within the vehicle and to a heads-up display (HUD). The controller includes a processor in communication with a memory device. The controller receives sensor data from the plurality of sensors, determines the vehicle is turning, identifies, based on the sensor data, a candidate turn path for the vehicle, and identifies an actual turn path for the vehicle. The controller also transmits, to one or more automation systems of the vehicle, a control signal that instructs the automation systems to perform a turn-assist function to reduce a determined deviation between the actual turn path and the candidate turn path and to transmit, to the HUD, a control signal that instructs the HUD to display a notification to a driver of the vehicle of the turn-assist function.

16 Claims, 6 Drawing Sheets

(51) Int. Cl.
- B60Q 9/00 (2006.01)
- B60K 35/00 (2006.01)
- G05D 1/02 (2020.01)
- G01C 21/20 (2006.01)
- B62D 15/02 (2006.01)
- *G06V 20/58* (2022.01)
- *G06V 20/56* (2022.01)

(52) U.S. Cl.
CPC .......... G01C 21/20 (2013.01); G05D 1/0088 (2013.01); G05D 1/0212 (2013.01); G05D 1/0231 (2013.01); G05D 1/0278 (2013.01); *B60K 2370/334* (2019.05); *B60W 2420/42* (2013.01); *B60W 2554/00* (2020.02); *B60W 2556/60* (2020.02); *G05D 2201/0213* (2013.01); *G06V 20/58* (2022.01); *G06V 20/588* (2022.01)

(58) Field of Classification Search
CPC .. G05D 1/0278; G05D 1/0231; G05D 1/0212; G05D 2201/0213; B60Q 9/00; B60K 35/00; B60K 2370/334; G01C 21/20; B62D 15/025; G06K 9/00805; G06K 9/00798
See application file for complete search history.

(56) References Cited

U.S. PATENT DOCUMENTS

| | | | |
|---|---|---|---|
| 9,283,847 B2 | 3/2016 | Riley, Sr. et al. | |
| 9,358,925 B2 | 6/2016 | Kariatsumari et al. | |
| 9,403,480 B2 | 8/2016 | Faeuster et al. | |
| 2012/0046802 A1* | 2/2012 | Inou | B60W 30/0956 701/1 |
| 2013/0190944 A1* | 7/2013 | Brandin | G06F 17/00 701/1 |
| 2015/0329140 A1* | 11/2015 | Tamaizumi | B62D 6/008 701/42 |
| 2016/0084661 A1* | 3/2016 | Gautama | G01C 21/26 701/400 |
| 2017/0166254 A1* | 6/2017 | Katoh | B62D 6/005 |
| 2017/0336629 A1* | 11/2017 | Suzuki | G05D 1/0088 |
| 2018/0058879 A1* | 3/2018 | Tayama | B60W 30/12 |
| 2018/0178839 A1* | 6/2018 | Ide | B62D 15/029 |
| 2018/0237008 A1* | 8/2018 | Matsumura | B62D 15/025 |
| 2019/0033872 A1* | 1/2019 | Hemes | G05D 1/0088 |
| 2019/0202497 A1* | 7/2019 | Hajika | B62D 5/0463 |
| 2019/0337532 A1* | 11/2019 | Myers | G05D 1/0088 |
| 2020/0108828 A1* | 4/2020 | Yue | B60W 30/045 |
| 2020/0282832 A1* | 9/2020 | Watanabe | H04N 7/18 |

FOREIGN PATENT DOCUMENTS

| | | |
|---|---|---|
| DE | 102016221495 A1 | 5/2017 |
| DE | 102017120628 A1 | 4/2018 |
| JP | 2011070311 A * | 4/2011 |
| JP | 2015120476 A * | 7/2015 |

OTHER PUBLICATIONS

English Translation: Nagiyama, JP 2011070311 A, Apr. 2011, Japanese Patent Office Patent Publication (Year: 2011).*

English Translation: Hattori, JP 2015120476 A, Jul. 2015, Japanese Patent Office Patent Publication (Year: 2015).*

\* cited by examiner

SEMI-AUTONOMOUS VEHICLE CONTROL SYSTEM AND METHOD OF CONTROLLING A SEMI-AUTONOMOUS VEHICLE

BACKGROUND

The field of the disclosure relates generally to vehicle control systems and, more particularly, to semi-autonomous vehicle control systems.

The use of semi-autonomous and autonomous vehicles is rapidly expanding. A semi-autonomous vehicle generally is a vehicle that includes one or more autonomous or vehicle-controlled functions that are inactive or on "standby" until activated based upon conditions of the vehicle and without express driver input or request. A semi-autonomous vehicle may be distinguished from a fully autonomous vehicle in that a fully autonomous vehicle requires substantially no driver input, whereas a semi-autonomous vehicle is operated generally based upon driver input, with one or more vehicle-controlled functions.

Some drivers may experience difficulty in transitioning from a fully driver-controlled vehicle to a vehicle that incorporates autonomous functions—for example, to a semi-autonomous vehicle. In particular, elderly drivers who are not used to having their vehicle be self-controlled may be startled when certain semi-autonomous functions, such as automatic collision avoidance or lane-keep assist along linear travel paths, are activated in their vehicle. For example, some drivers may not understand what the vehicle is attempting to do or may think the vehicle is experiencing a malfunction. Drivers with such reactions may exhibit unpredictable behavior, such as making attempts to counteract the semi-autonomous functions, braking suddenly, or exhibiting other unpredictable and potentially dangerous behaviors.

Accordingly, there is a need for a vehicle that incorporates a notification function that alerts a driver to an occurrence of a semi-autonomous function being enacted by a vehicle.

BRIEF DESCRIPTION

In one aspect, a vehicle control system for a semi-autonomous vehicle is provided. The vehicle control system includes a controller communicatively coupled to a plurality of sensors positioned within the semi-autonomous vehicle and to a heads-up display (HUD) within the semi-autonomous vehicle. The controller includes a processor in communication with a memory device. The controller is configured to: receive sensor data from the plurality of sensors, determine, based on the sensor data, the semi-autonomous vehicle is turning, identify, based on the sensor data, a candidate turn path for the semi-autonomous vehicle, and identify, based on the sensor data, an actual turn path for the semi-autonomous vehicle. The controller is further configured to transmit, to one or more automation systems of the semi-autonomous vehicle, a control signal that instructs the one or more automation systems to perform a turn-assist function to reduce a determined deviation between the actual turn path and the candidate turn path; and to transmit, to the HUD, a control signal that instructs the HUD to display a notification to a driver of the semi-autonomous vehicle of the turn-assist function.

In another aspect, a semi-autonomous vehicle is provided. The vehicle includes a plurality of sensors, a plurality of automation systems configured to control a corresponding plurality of components of the semi-autonomous vehicle, a heads-up display (HUD) configured to display information to a driver of the semi-autonomous vehicle, and a controller communicatively coupled to the plurality of sensors, the plurality of automation systems, and the HUD. The controller includes a processor in communication with a memory device. The controller is configured to: receive sensor data from the plurality of sensors, determine, based on the sensor data, the semi-autonomous vehicle is turning, identify, based on the sensor data, a candidate turn path for the semi-autonomous vehicle, and identify, based on the sensor data, an actual turn path for the semi-autonomous vehicle. The controller is further configured to transmit, to a first of the plurality of the automation systems, a control signal that instructs the first automation system to perform a turn-assist function to reduce a deviation between the actual turn path and the candidate turn path, and to transmit, to the HUD, a control signal that instructs the HUD to display a notification to the driver of the semi-autonomous vehicle of the turn-assist function.

In a further aspect, a method of controlling a semi-autonomous vehicle is provided. The method is implemented using a vehicle control system including a processor communicatively coupled to a memory device. The method includes receiving, from a plurality of sensors of the semi-autonomous vehicle, sensor data, determining, based on the sensor data, the semi-autonomous vehicle is turning, identifying, based on the sensor data, a candidate turn path for the semi-autonomous vehicle, and identifying, based on the sensor data, an actual turn path for said semi-autonomous vehicle. The method also includes calculating a deviation between the actual turn path and the candidate turn path, transmitting, to an automation system of the semi-autonomous vehicle, a control signal that instructs the automation system to perform a turn-assist function to reduce the deviation between the actual turn path and the candidate turn path, and transmitting, to a heads up display (HUD) of the semi-autonomous vehicle, a control signal that instructs the HUD to display a notification to a driver of said semi-autonomous vehicle of the turn-assist function.

DETAILED DESCRIPTION

Figure 1:
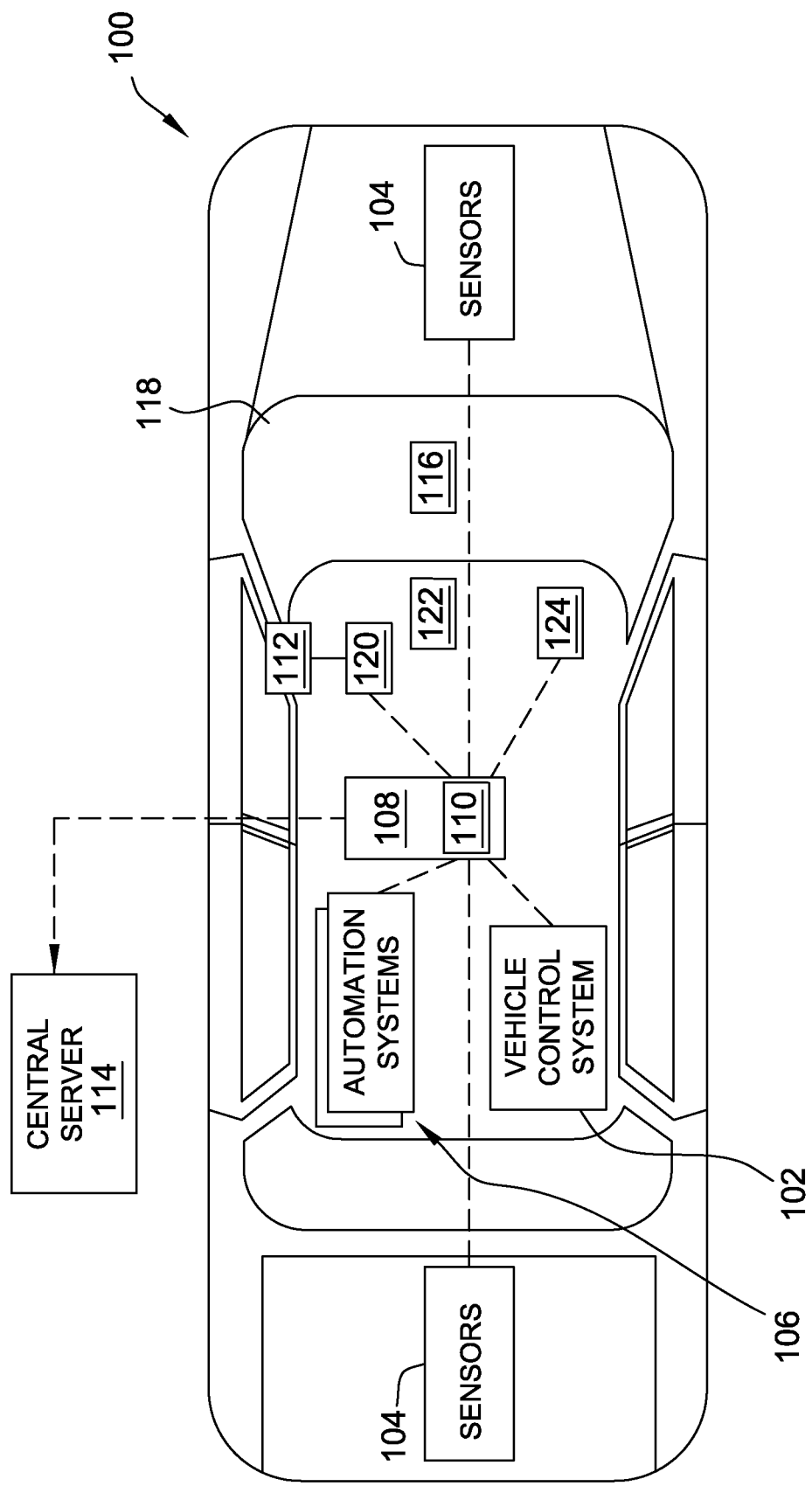
FIG. 1 is a schematic diagram of an exemplary vehicle including a vehicle control system.

Various embodiments will be better understood when read in conjunction with the appended drawings. To the extent that the figures illustrate diagrams of the functional blocks of various embodiments, the functional blocks are not necessarily indicative of the division between hardware circuitry.

Thus, for example, one or more of the functional blocks (e.g., systems, devices, processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

Various embodiments of methods and systems for controlling functions of a vehicle control system are provided. It should be noted that although the various embodiments are described in connection with the automotive industry, such as for use with an automobile, and in particular with a semi-autonomous vehicle, one or more embodiments may be implemented in different industries and/or for different applications. Additionally, communication of information used in accordance with one or more embodiments may be performed with different types of communication protocols, as well as using different types of communication lines and communication buses.

FIG. 1 is a schematic diagram of an exemplary vehicle 100. In the exemplary embodiment, vehicle 100 includes a semi-autonomous vehicle 100. A semi-autonomous vehicle, as referred to herein, generally is a vehicle that includes one or more autonomous or vehicle-controlled functions that are inactive or on "standby" until activated based upon conditions of the vehicle, without express driver input or request. A semi-autonomous vehicle may be distinguished from a fully autonomous vehicle in that a fully autonomous vehicle requires substantially no driver input, whereas a semi-autonomous vehicle is operated generally based upon driver input, with one or more vehicle-controlled functions. As described further herein, semi-autonomous vehicle 100 is capable of sensing aspects of its environment and, in some cases, assisting in or performing control aspects associated with piloting semi-autonomous vehicle 100. For example, as described further herein, vehicle 100 includes a vehicle control system 102 configured to perform a plurality of control operations associated with piloting semi-autonomous vehicle 100.

In the exemplary embodiment, vehicle 100 includes a plurality of sensors 104 that detect the current surroundings and location of vehicle 100. Sensors 104 may include, but are not limited to, radar, LIDAR, GPS receivers, video devices, imaging devices, cameras, audio recorders, and computer vision. For example, sensors 104 may include imaging sensors that capture image data of an environment of vehicle 100 (e.g., obstacles such as curbs, other vehicles, pedestrians; lane markers; road signs; road conditions; etc.). Sensors 104 may also include a GPS device that captures current location data indicating a current location of vehicle 100, and generate navigation data for vehicle 100 based upon the current location of vehicle 100 and a destination for vehicle 100. Sensors 104 may further include sensors that detect conditions of vehicle 100, such as speed, acceleration, gear, braking, and other conditions related to the operation of vehicle 100, for example: at least one of a measurement of at least one of speed, direction, rate of acceleration, rate of deceleration, location, position, orientation, and rotation or turning angle of the vehicle, and a measurement of one or more changes to at least one of speed, direction, rate of acceleration, rate of deceleration, location, position, orientation, and rotation of the vehicle.

Vehicle 100 further includes a plurality of automation systems 106. Automation systems 106 control one or more components of vehicle 100 in response to instruction(s) from, for example, a driver 120 of vehicle 100 and/or from vehicle control system 102. Automation systems 106 include electronic control devices and/or mechanical actuation devices that may be involved in some aspect of piloting vehicle 100, whether manually (i.e., in response to driver input) or autonomously (i.e., without driver input). Automation systems 106 may include, for example, a steering actuator, a braking actuator, and/or an acceleration actuator. Automation systems 106 may interpret the sensory information from sensors 104 while performing various operations. Additionally or alternatively, vehicle control system 102 may interpret the sensory information from sensors 104 and transmit instructions to automation system 106 to perform various operations.

Automation system functions may include, for example, (a) fully autonomous (e.g., driverless) driving; (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping and/or navigation systems; (q) software security and anti-hacking measures; (r) theft prevention/automatic return; and (s) automatic or semi-automatic driving without occupants; and/or other functionality.

Automation systems 106 may include, for example, rear-view sensors and alarms (e.g., to detect obstacles while in reverse), anti-lock braking systems (e.g., to prevent wheel locking during deceleration), traction control systems (e.g., actuating brakes or reducing throttle to restore traction if wheels begin to spin), electronic stability control and acceleration slip regulation (e.g., to prevent the car from understeering or oversteering), dynamic steering response (e.g., to correct the rate of power steering based upon road conditions), cruise control (e.g., to maintain vehicle speed), autonomous cruise control (e.g., to adjust cruising speed to maintain safe distance from vehicles ahead), lane departure systems (e.g., to alert the driver or adjust steering to keep the vehicle in its current lane), driver monitoring systems (e.g., to warn drivers when they become drowsy or fall asleep), adaptive headlamps (e.g., to alter the brightness or angle of headlamps), collision avoidance systems (e.g., to warn the driver an impending collision or adjust steering to avoid impending collision), parking assistance systems, blind spot monitoring systems, traffic sign recognition systems, dead man's switch systems, computer vision systems, location determination systems (e.g., GPS), and navigation systems (e.g., to navigate or assist in navigating the vehicle to a destination).

While not all sensor and/or actuator types for each particular automation system 106 are listed here, it should be understood that sensors 104 include any sensors sufficient to enable the associated automation system 106 to operate for its intended purpose. As such, each particular automation system 106 may utilize some data from sensors 104 to perform its underlying function.

Vehicle 100 also includes a communication system 108 that communicatively couples various electronics and computing devices on vehicle. In the exemplary embodiment, communication system 108 communicatively couples vehicle control system 102, sensors 104, and automation systems 106. Communication system 108 also includes communications device(s) 110 to enable vehicle 100 to communicate with one or more remote computer devices, such as one or more user computing devices 112 (e.g., a smart phone), a remote or central server 114, and/or other vehicles (not specifically shown). Communication devices 110 are communicatively coupled to the remote computing devices over any suitable connection, such as via a wired connection (e.g., using an Ethernet or USB cable) and/or via a wireless connection (e.g., via a wireless network adapter). Wireless connections may include, for example, a BLUETOOTH network or other near-field communication network, a cellular network, a satellite network, and a wireless vehicular ad-hoc network.

In the example embodiment, at least one communication device 110 is communicatively coupled to central server 114, which is associated with a manufacturer of vehicle 100, a service operator (e.g., a dealership, mechanic, or the like) of vehicle 100, and/or another party responsible for centrally managing data associated with vehicle 100 and/or the functionality thereof. For example, central server 114 may store and/or transmit map data, weather data, service schedule data, recall or repair data, software update data, and the like. In one example embodiment, central server 114 transmits software update data to vehicle 100 using an over-the-air (OTA) network connection, such that software executed by vehicle control system 102 can be remotely updated.

Vehicle 100 further includes a heads-up display (HUD) 116. In the example embodiment, HUD 116 is implemented as a projection onto a windshield 118 of vehicle 100 and/or as an embedded transparent digital component of windshield 118. In particular, HUD 116 is implemented as a digital overlay on windshield 118, such that HUD 116 is readily visible to a driver 120 of vehicle 100 during operation of vehicle 100. Moreover, as described further herein, HUD 116 can be implemented in at least some circumstances as an augmented reality overlay on windshield 118. For example, data displayed using HUD 116 is overlaid on the driver's view through windshield 118 to augment or supplement the driver's view as driver 120 is operating vehicle 100. In some embodiments, HUD 116 is additionally or alternatively implemented as one or more display devices 122 in a dashboard, console, and/or other portion of vehicle 100 (not specifically shown) that is also readily visible to driver 120 during operation of vehicle 100.

Vehicle control system 102 receives signals from sensors 104 to determine a state of operation of vehicle 100 and determine whether to activate one or more automation systems 106 associated with a respective one or more autonomous functions of vehicle 100.

Figure 2:
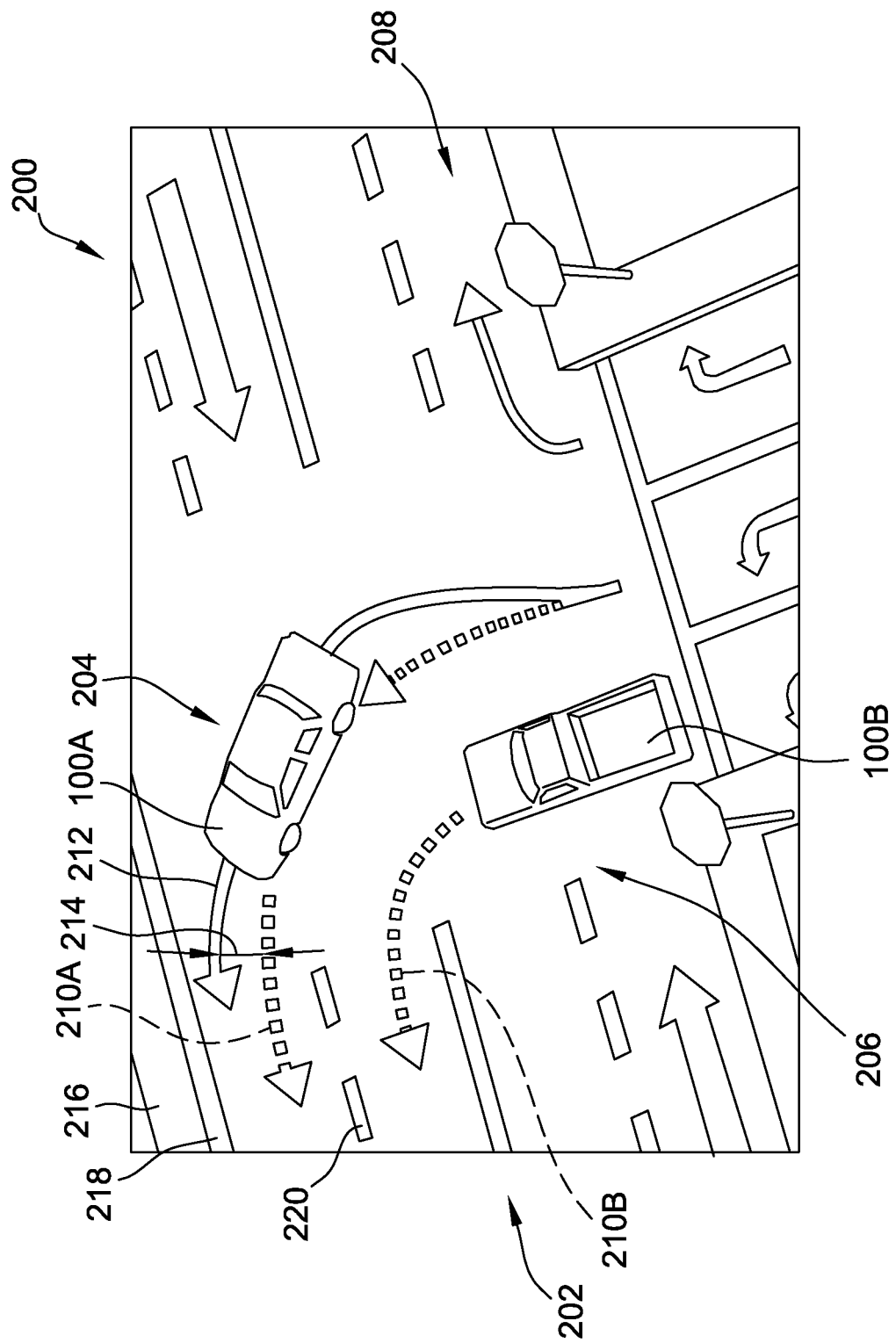
FIG. 2 illustrates an exemplary turning environment and a candidate path for vehicle such as the vehicle shown in FIG. 1.

In the exemplary embodiment, vehicle control system 102 receives sensor data from sensors 104 to identify a candidate path of vehicle 100 (also referred to as a "candidate turn path" if vehicle 100 is turning). Specifically, vehicle control system 102 determines where vehicle 100 is likely to or is intended to travel. With reference to FIG. 2, a turning environment 200 of two vehicles 100A and 100B is illustrated. Turning environment 200 includes a two-lane left turn 202, in which vehicle 100A is travelling in the outermost left turn lane 204 and vehicle 100B is travelling in the innermost left turn lane 206. A right turn lane 208 is also shown, although no vehicle is travelling in right turn lane 208. In turning environment 200, vehicle 100A has a candidate turn path 210A in outermost left turn lane 204. Specifically, vehicle 100A is likely to or is intended to traverse candidate turn path 210A as vehicle 100A turns left in outermost left turn lane 204. Vehicle 100B has a candidate turn path 210B in innermost left turn lane 206. Specifically, vehicle 100B is likely to or is intended to traverse candidate turn path 210B as vehicle 100B turns left in innermost left turn lane 206.

Vehicle control system 102 may receive and utilize sensor data from, for example, one or more cameras or imaging systems, a navigation system (e.g., a GPS device), and/or additional sensors 104 to identify the particular candidate path of vehicle 100 (e.g., candidate path 210A of vehicle 100A and/or candidate path 210B vehicle 100B). For example, vehicle control system 102 detects, from the sensor data, at least one lane marker and at least one obstacle (e.g., a curb, another vehicle, a pedestrian, etc.) and identifies a candidate path for vehicle 100 based on the at least one lane marker and the at least one obstacle. As another example, vehicle control system 102 identifies the candidate path for vehicle 100 based on current location data from a location system (e.g., the GPS device) indicating a current location of vehicle 100 and navigation data indicating a destination of vehicle 100, for example, from the GPS device. As yet another example, vehicle control system 102 identifies the candidate path for vehicle 100 based on historical location, travel, and/or navigation data. For instance, if driver 120 of vehicle 100 frequently travels a certain path on certain days at certain times (e.g., a regular commute to or from work), vehicle control system 102 may predict the candidate path of vehicle 100 as including that frequently travelled path.

Vehicle control system 102 determines vehicle 100 is turning based on sensor data, such as data from one or more imaging systems, one or more steering sensors, and the like. Vehicle control system 102 then identifies an actual path of vehicle 100—the path vehicle 100 is currently traversing—based on, for example, data from one or more imaging systems, location systems (e.g., GPS devices), and the like. With reference again to FIG. 2, vehicle 100A has an actual path 212. Specifically, vehicle 100A is currently travelling along actual path 212.

Vehicle control system 102 calculates, projects, predicts, and/or otherwise identifies a deviation of the actual path of vehicle 100 (e.g., actual path 212 of vehicle 100A) from the candidate path of vehicle 100 (e.g., candidate path 210A of vehicle 100A) as vehicle 100 is turning. With reference to FIG. 1, vehicle control system 102 calculates a deviation 214 between actual path 212 and candidate path 210A.

When the deviation reaches a particular threshold, vehicle control system 102 activates an automation system 106 associated with a steering function of vehicle 100 to control steering of vehicle 100 and reduce the deviation between the actual path and the candidate path. The threshold may be a predefined value, such as certain angular deviation or instantaneous distance between the actual path and the candidate path. The threshold may be dynamically defined based on the current conditions of vehicle 100 and/or the road on which vehicle 100 is travelling. With reference again to FIG. 2, for vehicle 100A turning in two-lane turning environment 200 (e.g., having two left turn lanes 204, 206), the threshold may be dynamically defined based on a calculated, detected, or otherwise determined amount of acceptable allowance of actual path 212 with respect to one or more obstacle(s) (e.g., vehicle 100B and/or a curb 216) that avoids a collision with the obstacle(s), and/or an acceptable allowance away from and/or near to a detected lane marker (e.g., lane markers 218 and/or 220). Such a threshold may be smaller than a threshold dynamically defined during a turn defined by fewer identified obstacles, greater distance between lane markers, and/or any other characteristics.

Vehicle control system 102, in response to determining the threshold has been exceeded, activates the steering automation system 106 to reduce the calculated deviation and return vehicle 100 to the candidate path. This automated steering function may be referred to a turn-assist function. In FIG. 2, vehicle control system 102 activates the steering automation system 106 to reduce deviation 214, for example, to steer vehicle 100A more to the left, to avoid collision with curb 216 and/or crossing over lane marker 218.

As described above, some drivers 120 may be startled or confused when they experience the turn-assist function, in which vehicle 100 adjusts its turn path autonomously. Accordingly, to reduce driver confusion, vehicle control system 102 further controls HUD 116 to display a notification that the turn-assist function has been activated.

Figure 3:
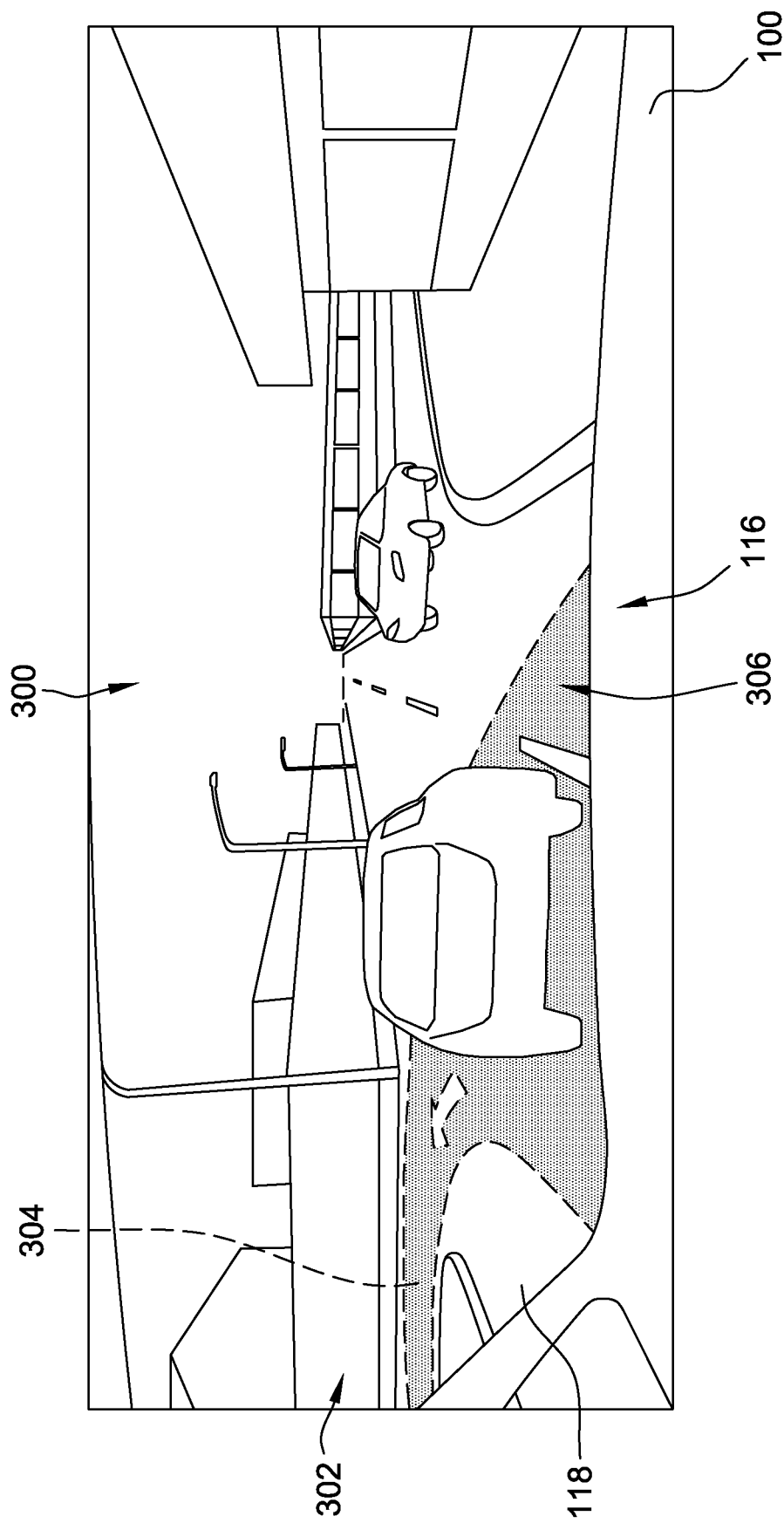
FIG. 3 illustrates an exemplary heads-up display of the vehicle shown in FIG. 1 as the vehicle encounters a turning environment such as that shown in FIG. 2.
Figure 4:
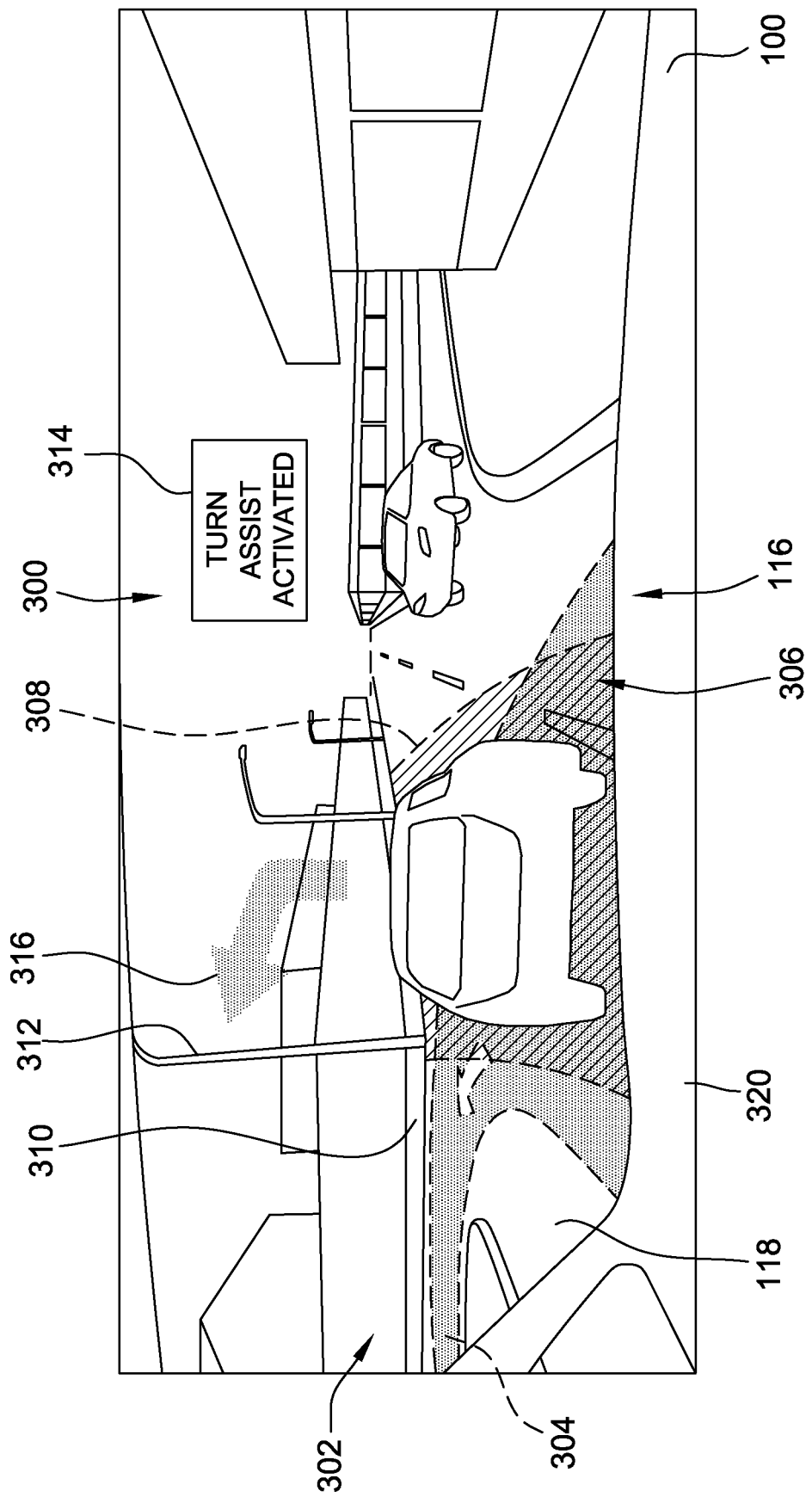
FIG. 4 illustrates the heads-up display shown in FIG. 3 including a notification generated by the vehicle control system shown in FIG. 1 as the vehicle control system adjusts a turn path of the vehicle.

Turning now to FIGS. 3 and 4, a perspective view of a driver 120 (not shown in FIGS. 3 and 4) of vehicle 100 is illustrated. As shown, the driver is viewing their turning environment 300 through windshield 118. In this embodiment, turning environment 300 includes a left turn 302 along a candidate path 304. Moreover, heads-up display (HUD) 116 depicts candidate path 304 as an augmented reality overlay 306 on windshield 118. As such, the driver is able to see candidate path 304 overlaid on their view of turning environment 300. In some embodiments, vehicle control system 102 (not shown in FIGS. 3 and 4) identifies candidate path 304 based on data from a navigation system onboard vehicle 100 or activated on a user computing device 112 (not shown in FIGS. 3 and 4) within vehicle 100. For example, vehicle control system 102 determines vehicle 100 is likely to turn left at left turn 302, and accordingly controls HUD 116 to display candidate path 304 overlaid on the driver's view of left turn 302.

Vehicle control system 102 also identifies an actual path 308 of vehicle 100 and displays actual path 308 as part of augmented reality overlay 306. In the illustrated embodiment, actual path 308 deviates from candidate path 304, and accordingly actual path 308 is shown in augmented reality overlay 306 as separate from candidate path 304. (In situations in which actual path 308 does not deviate from candidate path 304, only one path may be displayed in augmented reality overlay 306.) As shown, actual path 308 is directed toward a curb 310 and a street lamp 312. If vehicle 100 were to continue to traverse actual path 308, vehicle 100 may collide with curb 310 and/or street lamp 312.

Vehicle control system 102 determines this likely collision associated with actual path 308 and determines that a threshold of a deviation between actual path 308 and candidate path 304 is therefore exceeded. Vehicle control system 102 activates a steering automation system 106 (not shown in FIGS. 3 and 4) that controls a steering operation of vehicle 100. Specifically, vehicle control system 102 activates a turn-assist function of vehicle 100. Vehicle control system 102 transmits a control signal to steering automation system 106 that causes steering automation system 106 to steer vehicle 100 along candidate path 304, or to reduce a deviation between actual path 308 and candidate path 304 to return vehicle 100 to candidate path 304.

Vehicle control system 102 also transmits a control signal to HUD 116 to display a notification 314 that the turn-assist function has been activated. In some embodiments, vehicle control system 102 substantially simultaneously transmits the control signals to steering automation system 106 and HUD 116, such that HUD 116 displays notification 314 substantially simultaneously with the activation of the turn-assist function, as implemented using steering automation system 106. In some embodiments, vehicle control system 102 transmits the control signal to HUD 116 slightly before transmitting the control signal to steering automation system 106, such that HUD 116 displays notification 314 slightly before the turn-assist function is activated. In such embodiments, the driver 120 receives notification 314 slightly before experiencing the automated turning of vehicle 100, which may reduce confusion experienced by the driver 120 or otherwise provide the driver 120 with advance notice of the turn-assist function.

In the example embodiment, notification 314 is a text-based notification projected on windshield 118 as part of augmented reality overlay 306. Notification 314 may additionally or alternatively include various icons, such as an arrow icon 316 or any other icon or graphic suitable to convey to the driver 120 that the turn-assist function is activated or about to be activated. Additionally or alternatively, notification 314 is an audible notification played through speakers of vehicle 100. For example, vehicle control system 102 may transmit a control signal to an audio system 124 of vehicle 100 that instructs audio system 124 to produce an audio output including an audio notification. Additionally or alternatively, notification 314 is displayed on a different portion of HUD 116, such as on a display device 122 in a console 320 of vehicle 100. For example, vehicle control system 102 may transmit a control signal to a display device 122 of vehicle 100 that instructs display device 122 to display notification 314 (or an additional/alternative notification).

While the vehicle 100 shown and described herein may be an automobile in the exemplary embodiment, in other embodiments, vehicle 100 may be, but is not limited to, other types of ground craft, aircraft, and watercraft vehicles. Accordingly, "vehicle," as used herein, may include any kind of vehicle, such as, for example, cars, trucks, all-terrain vehicles (ATVs), motorcycles, recreational vehicles (RVs), snowmobiles, boats, autonomous vehicles, semi-autonomous vehicles, commercial vehicles (e.g., trucking), industrial vehicles (e.g., construction vehicles), "riding" lawn-mowers, planes, and/or any kind of land-, water-, or air-based vehicle.

Figure 5:
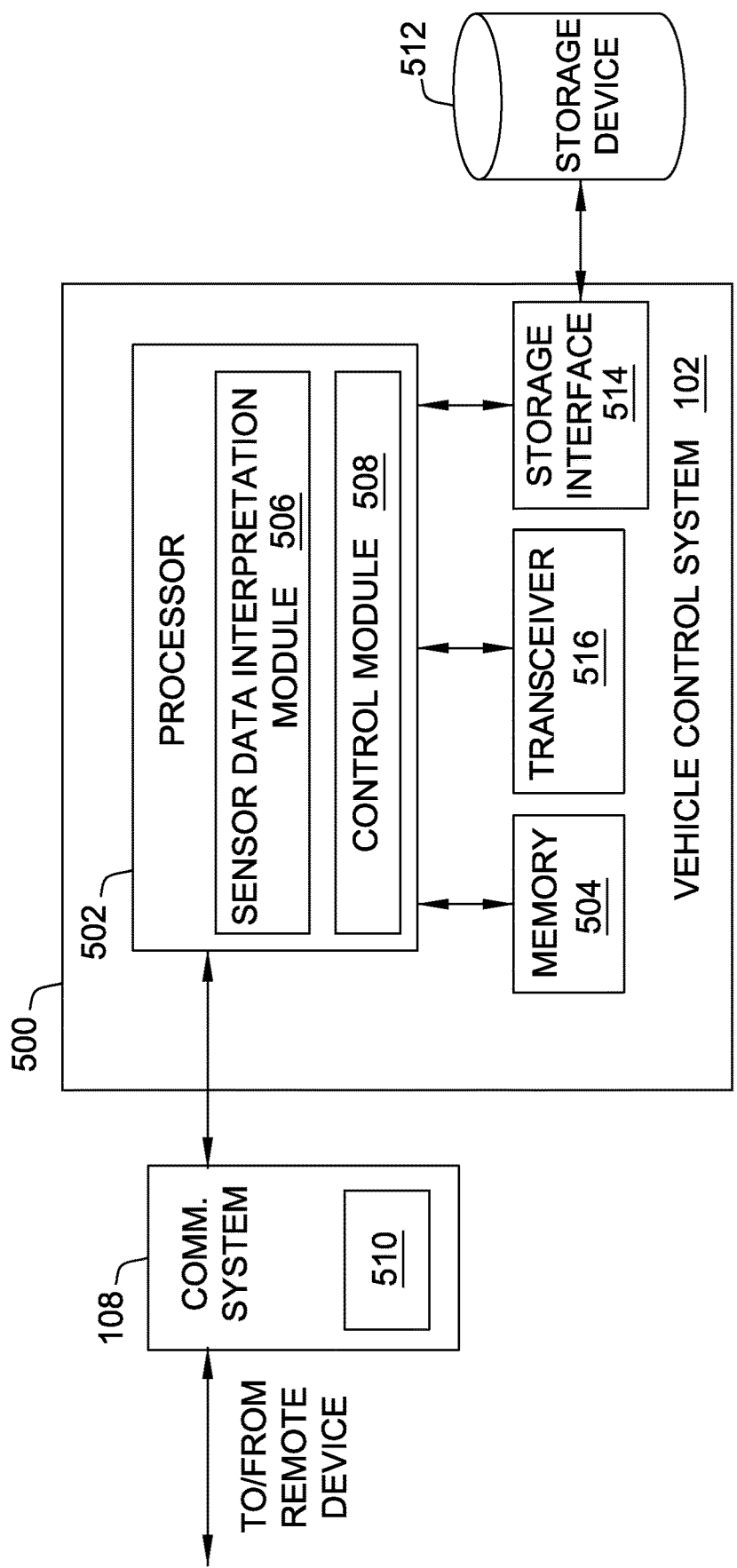
FIG. 5 is a schematic diagram of an exemplary computing device that may be used to implement the vehicle control system shown in FIG. 1.

FIG. 5 is a schematic diagram of a computing device 500 that may be used to implement vehicle control system 102 shown in FIG. 1. Computing device 500 includes a processor 502 for executing instructions. Instructions are stored in a memory area 504, for example. Processor 502 includes one or more processing units (e.g., in a multi-core configuration), and is operable to execute a sensor data interpretation module 506 and a control module 508. Sensor data interpretation module 506 receives and interprets (e.g., process, analyze, etc.) sensor data from sensors 104 (shown in FIG. 1). Control module 508 generates control signals based on the interpreted sensor data, and transmit the control signals to other components of vehicle 100 (e.g., automation system 106, shown in FIG. 1). Modules 506 and 508 may include specialized instruction sets, coprocessors, and/or kernel extensions.

Processor 502 is operatively coupled to communication system 108. In some embodiments, communication system 108 (and/or one or more communication devices 110 thereof, shown in FIG. 1) includes a network interface 510. Network interface 510 enables communication with remote device(s) such as user computing devices 112 and/or central server 114 (both shown in FIG. 1). In certain embodiments, network interface 510 is associated with a respective network address, such as an IP ("internet protocol") address. In other embodiments, network interface 510 is associated with physical network links. Network interface 510 may include a wired or wireless network adapter or a wireless data transceiver for use with a mobile phone network (e.g., Global System for Mobile communications (GSM), 3G, 4G, or BLUETOOTH) or other mobile data network (e.g., Worldwide Interoperability for Microwave Access (WIMAX)). Network interface 510 may be configured to transmit and/or receive data. Computing device 500 may additionally or alternatively include a transceiver 516 integral thereto. Transceiver 516 may communicate with processor 502 via a communication line, and may communicate wirelessly or via a wired connection with remote devices, such as sensors 104, automation systems 106, user computing devices 112, and/or remote server 114.

Processor 502 is operatively coupled to a storage device 512, which may be associated with and/or integral to remote server 114. Storage device 512 is any computer-operated hardware suitable for storing and/or retrieving data. In some embodiments, processor 502 is operatively coupled to storage device 512 via a storage interface 514. Storage interface 514 is any component capable of providing processor 502 with access to storage device 512. Storage interface 514 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 502 with access to storage device 512.

Memory area 504 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
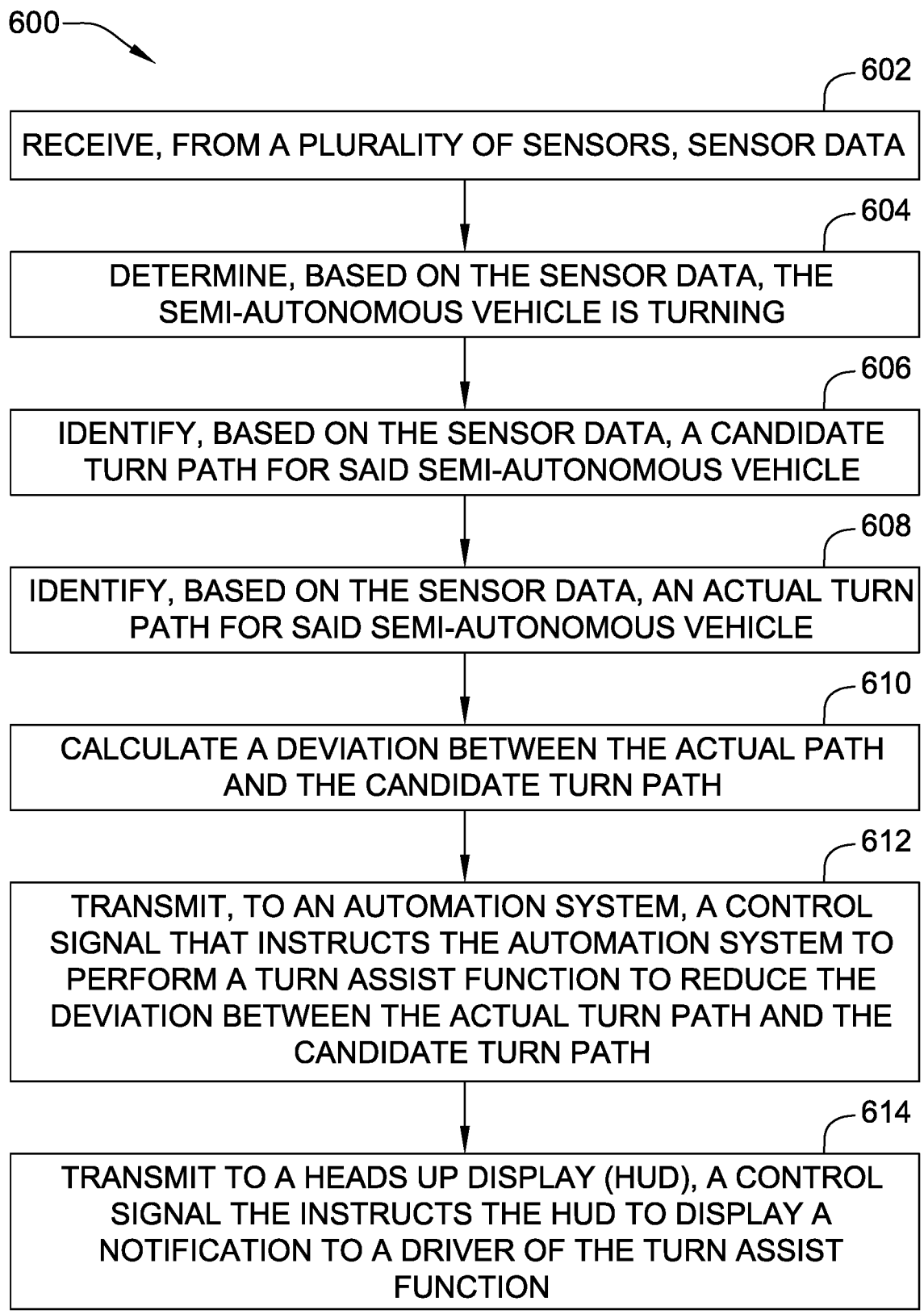
FIG. 6 is a flow chart of an exemplary method of controlling a semi-autonomous vehicle using the vehicle control system shown in FIG. 1.

FIG. 6 is a flow chart of an exemplary method 600 of controlling a semi-autonomous vehicle (e.g., vehicle 100, shown in FIG. 1). Method 600 is implemented using vehicle control system 102 (shown in FIG. 1).

In the exemplary embodiment, method 600 includes receiving 602, from a plurality of sensors (e.g., sensors 104, shown in FIG. 1) of the semi-autonomous vehicle, sensor data, and determining 604, based on the sensor data, the semi-autonomous vehicle is turning. Method 600 also includes identifying 606, based on the sensor data, a candidate turn path for said semi-autonomous vehicle, and identifying 608, based on the sensor data, an actual turn path for said semi-autonomous vehicle. Method 600 also includes calculating 610 a deviation between the actual path and the candidate turn path.

Method 600 further includes transmitting 612, to an automation system (e.g., a steering automation system 106, shown in FIG. 1) of the semi-autonomous vehicle, a control signal that instructs the automation system to perform a turn-assist function to reduce the deviation between the actual turn path and the candidate turn path. Method 600 also includes transmitting 614, to a heads up display (HUD) (e.g., HUD 116, shown in FIG. 1) of the semi-autonomous vehicle, a control signal that instructs the HUD to display a notification to a driver of said semi-autonomous vehicle of the turn-assist function. In some embodiments, transmitting 612 and transmitting 614 are performed substantially simultaneously.

Method 600 may include additional, fewer, and/or alternative steps. For example, in some embodiments, transmitting 614 includes transmitting the control signal to further instruct the HUD to display the candidate turn path and the actual turn path as an augmented reality overlay (e.g., augmented reality overlay 306, shown in FIGS. 3 and 4) on a windshield (e.g., windshield 118, shown in FIG. 1) of the semi-autonomous vehicle. In some embodiments, transmitting 612 includes transmitting the control signal to a steering automation system configured to steer the semi-autonomous vehicle in response to receiving the control signal.

In some embodiments, method 600 further includes transmitting, to an audio system (e.g., audio system 124, shown in FIG. 1) of the semi-autonomous vehicle, a control signal that instructs the audio system to produce an audio output including an audio notification to the driver of the semi-autonomous vehicle of the turn-assist function.

Embodiments of the semi-autonomous vehicle including the vehicle control system described herein facilitate maintaining a vehicle within a lane, specifically while the vehicle is undertaking a turn, by implementing a turn-assist function. Moreover, as described herein, the vehicle control system also facilitates notifying a driver of the turn-assist function to improve driver understanding of the functionality of the semi-autonomous vehicle and reduce confusion or other negative reactions to the turn-assist function.

The methods and system described herein may be implemented using computer programming or engineering techniques including computer software, firmware, hardware, or any combination or subset. Some technical problems with known systems include (a) a lack of lane-keep assist functionality during turns; (b) a lack of understanding of semi-autonomous functionality while the functionality is being implemented in a semi-autonomous vehicle; and (c) confusion or negative reactions to unexpected semi-autonomous functionality. Embodiments of the systems and methods described herein address such technical problems. The technical effect of at least some embodiments of the systems and processes described herein is achieved by performing at least one of the following steps: (i) receiving, from a plurality of sensors of the semi-autonomous vehicle, sensor data; (ii) determining, based on the sensor data, the semi-autonomous vehicle is turning; (iii) identifying, based on the sensor data, a candidate turn path for said semi-autonomous vehicle; (iv) identifying, based on the sensor data, an actual turn path for said semi-autonomous vehicle; (v) calculating a deviation between the actual path and the candidate turn path; (vi) transmitting, to an automation system of the semi-autonomous vehicle, a control signal that instructs the automation system to perform a turn-assist function to reduce the deviation between the actual turn path and the candidate turn path; and (vii) transmitting, to a heads up display (HUD) of the semi-autonomous vehicle, a control signal that instructs the HUD to display a notification to a driver of said semi-autonomous vehicle of the turn-assist function. The resulting technical effect is that a semi-autonomous vehicle may implement lane-keep assist functionality during turns and may keep a driver notified of the semi-autonomous functionality of the vehicle while such functionality is implemented.

One or more embodiments include a system, which may be implemented as a programmable logic controller (PLC), also referred to as a programmable logic circuit or simply "controller," that controls various functions and operations of the vehicle. The controller may control display functions on one or more display devices or screens. The controller may monitor, receive, detect, interpret, and/or transmit one or more inputs or outputs between a display device and a control panel. Moreover, the controller may receive, detect, monitor, and/or transmit signals from other components of the vehicle control system, including sensors and actuators.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A vehicle control system for a semi-autonomous vehicle, said vehicle control system comprising a controller communicatively coupled to a plurality of sensors positioned within the semi-autonomous vehicle and to a heads-up display (HUD) within the semi-autonomous vehicle, said controller comprising a processor in communication with a memory device, said controller configured to:
    receive sensor data from the plurality of sensors;
    determine, based on the sensor data, the semi-autonomous vehicle is turning;
    identify, based on the sensor data, a candidate turn path for the semi-autonomous vehicle;
    identify, based on the sensor data, an actual turn path that the semi-autonomous vehicle is traversing while under manual control;
    determine a deviation between the actual turn path and the candidate turn path;
    based on the determined deviation, transmit, to one or more automation systems of the semi-autonomous vehicle, a first control signal that activates the one or more automation systems to perform a turn-assist function to reduce the determined deviation between the actual turn path and the candidate turn path;
    transmit, to the HUD, a second control signal that instructs the HUD to display a notification to a driver of the semi-autonomous vehicle that indicates activation of the turn-assist function; and
    instruct the HUD, in response to the second control signal, to display the candidate turn path and the actual turn path as an augmented reality overlay on a windshield of the semi-autonomous vehicle.

2. The vehicle control system of claim 1, wherein said controller is further configured to:
    simultaneously transmit the first control signal to the one or more automation systems and the second control signal to the HUD.

3. The vehicle control system of claim 1, wherein said controller is further configured to:
    transmit the second control signal to the HUD prior to transmitting the first control signal to the one or more automation systems.

4. The vehicle control system of claim 1, wherein the plurality of sensors include one or more imaging sensors, wherein said controller is further configured to:
    detect, from the sensor data, at least one lane marker and at least one obstacle; and
    identify the candidate turn path for the semi-autonomous vehicle based on the at least one lane marker and the at least one obstacle.

5. The vehicle control system of claim 1, wherein the plurality of sensors include a Global Positioning System (GPS) device, wherein said controller is further configured to:
    identify the candidate turn path for the semi-autonomous vehicle based on the sensor data including current location data indicating a current location of the semi-autonomous vehicle and navigation data indicating a destination of the semi-autonomous vehicle from the GPS device.

6. A semi-autonomous vehicle comprising:
    a plurality of sensors;
    a plurality of automation systems configured to control a corresponding plurality of components of said semi-autonomous vehicle;
    a heads-up display (HUD) configured to display information to a driver of said semi-autonomous vehicle; and
    a controller communicatively coupled to said plurality of sensors, said plurality of automation systems, and said HUD, said controller comprising a processor in communication with a memory device, said controller configured to:
        receive sensor data from said plurality of sensors;
        determine, based on the sensor data, said semi-autonomous vehicle is turning;
        identify, based on the sensor data, a candidate turn path for said semi-autonomous vehicle;
        identify, based on the sensor data, an actual turn path that said semi-autonomous vehicle is traversing while under manual control;
        determine a deviation between the actual turn path and the candidate turn path;
        based on the determined deviation, transmit, to a first of said plurality of said automation systems, a first control signal that activates said first automation system to perform a turn-assist function to reduce the determined deviation between the actual turn path and the candidate turn path; and
        transmit, to said HUD, a second control signal that instructs said HUD to display a notification to the driver of said semi-autonomous vehicle that indicates activation of the turn-assist function;
    wherein said HUD is further configured to, in response to the second control signal, display the candidate turn path and the actual turn path as an augmented reality overlay on a windshield of the semi-autonomous vehicle.

7. The semi-autonomous vehicle of claim 6, wherein said controller is further configured to:
   simultaneously transmit the first control signal to said first automation system and the second control signal to said HUD.

8. The semi-autonomous vehicle of claim 6, wherein said controller is further configured to:
   transmit the second control signal to said HUD prior to transmitting the first control signal to said first automation system.

9. The semi-autonomous vehicle of claim 6, wherein said plurality of sensors comprise one or more imaging sensors, said one or more imaging sensors configured to:
   capture image sensor data including at least one lane marker and at least one obstacle, and
   wherein said controller is further configured to:
   detect, from the image sensor data, the at least one lane marker and the at least one obstacle; and
   identify the candidate turn path for said semi-autonomous vehicle based on the detected at least one lane marker and the detected at least one obstacle.

10. The semi-autonomous vehicle of claim 6, wherein said plurality of sensors comprise a Global Positioning System (GPS) device, said GPS device configured to:
    capture current location data indicating a current location of said semi-autonomous vehicle; and
    generate navigation data for said semi-autonomous vehicle based upon the current location of said semi-autonomous vehicle and a destination for said semi-autonomous vehicle, and
    wherein said controller is further configured to:
    identify the candidate turn path for said semi-autonomous vehicle based on the current location data and the navigation data from said GPS device.

11. The semi-autonomous vehicle of claim 6, wherein said first automation system comprises a steering actuator configured to, in response to the first control signal from said controller, steer said semi-autonomous vehicle to perform the turn-assist function.

12. The semi-autonomous vehicle of claim 6, further comprising an audio system, wherein said controller is further configured to:
    transmit, to said audio system, a third control signal that instructs said audio system to produce an audio output including an audio notification to the driver of said semi-autonomous vehicle that indicates activation of the turn-assist function.

13. A method of controlling a semi-autonomous vehicle, said method implemented using a vehicle control system including a processor communicatively coupled to a memory device, said method comprising:
    receiving, from a plurality of sensors of the semi-autonomous vehicle, sensor data;
    determining, based on the sensor data, the semi-autonomous vehicle is turning;
    identifying, based on the sensor data, a candidate turn path for the semi-autonomous vehicle;
    identifying, based on the sensor data, an actual turn path that the semi-autonomous vehicle is traversing while under manual control;
    determining a deviation between the actual turn path and the candidate turn path;
    based on the determined deviation, transmitting, to an automation system of the semi-autonomous vehicle, a first control signal that activates the automation system to perform a turn-assist function to reduce the determined deviation between the actual turn path and the candidate turn path;
    transmitting, to a heads up display (HUD) of the semi-autonomous vehicle, a second control signal that instructs the HUD to display a notification to a driver of said semi-autonomous vehicle that indicates activation of the turn-assist function; and
    instructing the HUD, in response to the second control signal, to display the candidate turn path and the actual turn path as an augmented reality overlay on a windshield of the semi-autonomous vehicle.

14. The method of claim 13, wherein said transmitting the first control signal to the automation system and said transmitting the second control signal to the HUD are performed substantially simultaneously.

15. The method of claim 13, wherein said transmitting the first control signal to the automation system comprises transmitting the first control signal to a steering automation system configured to steer the semi-autonomous vehicle in response to receiving the first control signal.

16. The method of claim 13 further comprising transmitting, to an audio system of the semi-autonomous vehicle, a third control signal that instructs the audio system to produce an audio output including an audio notification to the driver of the semi-autonomous vehicle that indicates activation of the turn-assist function.

* * * * *